(12) United States Patent
Suyama et al.

(10) Patent No.: US 11,945,699 B2
(45) Date of Patent: Apr. 2, 2024

(54) COLLECTION METHOD AND COLLECTION SYSTEM

(71) Applicant: TOYOTA JIDOSHA KABUSHIKI KAISHA, Toyota (JP)

(72) Inventors: Kazuo Suyama, Suginami-ku (JP); Katsuji Harajiri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 17/335,658

(22) Filed: Jun. 1, 2021

(65) Prior Publication Data
US 2022/0033232 A1 Feb. 3, 2022

(30) Foreign Application Priority Data
Jul. 28, 2020 (JP) ................. 2020-127306

(51) Int. Cl.
*B66C 21/00* (2006.01)
*A01G 23/00* (2006.01)
*A01G 23/06* (2006.01)

(52) U.S. Cl.
CPC ........... *B66C 21/00* (2013.01); *A01G 23/003* (2013.01); *A01G 23/062* (2013.01)

(58) Field of Classification Search
CPC .... A01G 23/08; A01G 23/081; A01G 23/083; A01G 23/087; A01G 23/091; A01G 23/095; A01G 23/0955; A01G 23/097; A01G 23/093; B66C 21/00
USPC .................................................. 144/10, 34.1
See application file for complete search history.

(56) References Cited

U.S. PATENT DOCUMENTS

| | | | | |
|---|---|---|---|---|
| 3,371,692 A | * | 3/1968 | Larson | A01G 23/091 144/34.1 |
| 3,638,693 A | * | 2/1972 | Sundberg | A01G 23/091 144/338 |
| 2006/0237385 A1 | | 10/2006 | Baker | |
| 2018/0215466 A1 | | 8/2018 | Hall | |
| 2020/0305361 A1 | | 10/2020 | Suyama et al. | |

FOREIGN PATENT DOCUMENTS

| | | | |
|---|---|---|---|
| JP | 2002-209457 A | 7/2002 | |
| JP | 2008-109918 A | 5/2008 | |
| JP | 3162428 U | 9/2010 | |
| JP | 2020-162456 A | 10/2020 | |
| WO | WO2002016182 * | 2/2002 | |
| WO | WO-2018080310 A1 * | 5/2018 | A01G 23/003 |

* cited by examiner

*Primary Examiner* — Jimmy T Nguyen
*Assistant Examiner* — Smith Oberto Bapthelus
(74) *Attorney, Agent, or Firm* — Oblon, McClelland, Maier & Neustadt, L.L.P.

(57) ABSTRACT

A collection method using a collection system including a lifting device that is configured to wind up an overhead line supported by a support post, a suspension device that is connected to the overhead line and is movable in the air as the lifting device winds the overhead line, and a grip device suspended from the suspension device includes a step of gripping a tree by the grip device at two points, a step of cutting the gripped tree, a step of tilting the cut tree such that a longitudinal direction of the tree is along a horizontal direction, and a step of conveying the tree gripped by the grip device as the lifting device winds the overhead line.

3 Claims, 6 Drawing Sheets

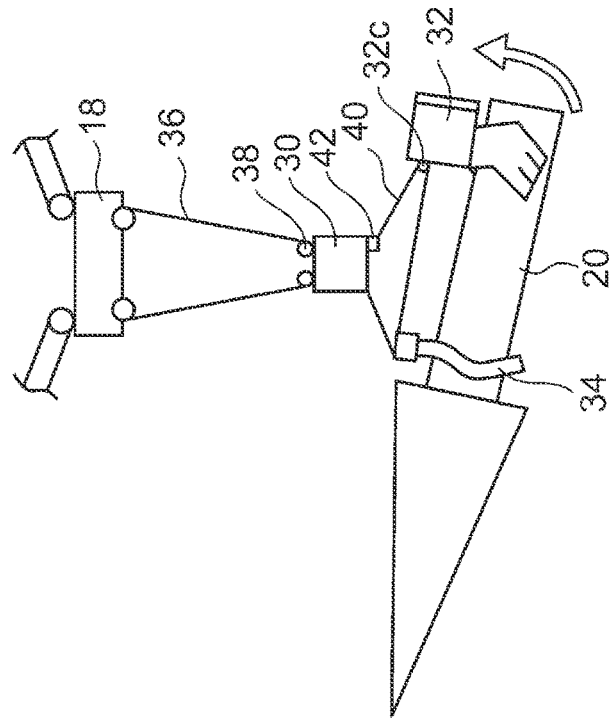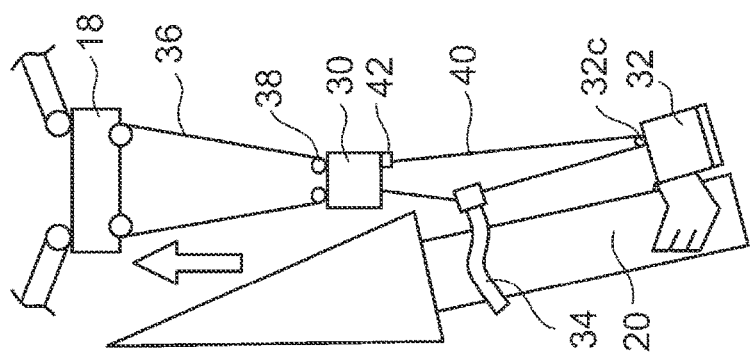

COLLECTION METHOD AND COLLECTION SYSTEM

CROSS-REFERENCE TO RELATED APPLICATION

This application claims priority to Japanese Patent Application No. 2020-127306 filed on Jul. 28, 2020, incorporated herein by reference in its entirety.

BACKGROUND

1. Technical Field

The disclosure relates to a technique for collecting trees using an overhead line.

2. Description of Related Art

Japanese Unexamined Patent Application Publication No. 2008-109918 (JP 2008-109918 A) discloses a timber conveyance system for conveying timber from forest thinning from a logging position to an unloading position. The timber conveyance system above includes a tower yarder disposed in proximity to the unloading position on a work road, a first winch that is provided in the tower yarder and winds a first wire, a second winch that is provided in the tower yarder and winds a second wire, a plurality of pulleys that is connected in the middle of a traveling path of the second wire and converts a traveling direction of the second wire, a loading tool that loads the timber, and a plurality of zigzag pulleys that is connected in the middle of a traveling path of the loading tool and converts a traveling direction of the loading tool.

SUMMARY

The technique described in JP 2008-109918 A conveys timber through a work road formed in the forest. Therefore, it is difficult to convey timber in the forest without any work road. In addition, when the cut trees are lifted and conveyed over the forest, it is preferable to suppress contact with other trees.

An object of the disclosure is to provide a technique for stably conveying a cut tree.

To solve the issue above, an aspect of the disclosure is a collection method using a collection system including a lifting device that is configured to wind up an overhead line supported by a support post, a suspension device that is connected to the overhead line and is movable in the air as the lifting device winds the overhead line, and a grip device suspended from the suspension device. The collection method includes a step of gripping a tree by the grip device at at least two points, a step of cutting the gripped tree, a step of tilting the cut tree such that a longitudinal direction of the tree is along a horizontal direction, and a step of conveying the tree gripped by the grip device as the lifting device winds the overhead line.

Another aspect of the disclosure is a collection system. The collection system includes a plurality of support posts, an overhead line supported by the support posts, a lifting device that is configured to wind up the overhead line, a suspension device that is connected to the overhead line and is movable in the air as the lifting device winds the overhead line, and a grip device suspended from the suspension device. The grip device includes a first grip portion that grips a root side of a tree, a second grip portion that grips an upper portion of the tree with respect to the first grip portion, a wire that suspends the first grip portion and the second grip portion, and a motor that winds up the wire. The motor is driven to wind the wire so as to tilt the tree that is cut such that the cut tree is along a horizontal direction, and the lifting device winds the overhead line to convey the tilted tree.

According to the disclosure, it is possible to provide a technique for stably conveying a cut tree.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a diagram for describing an operation of the overhead line collection system that collects the tree, showing a sequence following FIG. 3C;

FIG. 4B is a diagram for describing an operation of the overhead line collection system that collects the tree, showing a sequence following FIG. 3C;

FIG. 4C is a diagram for describing an operation of the overhead line collection system that collects the tree, showing a sequence following FIG. 3C;

DETAILED DESCRIPTION OF EMBODIMENTS

Figure 1:
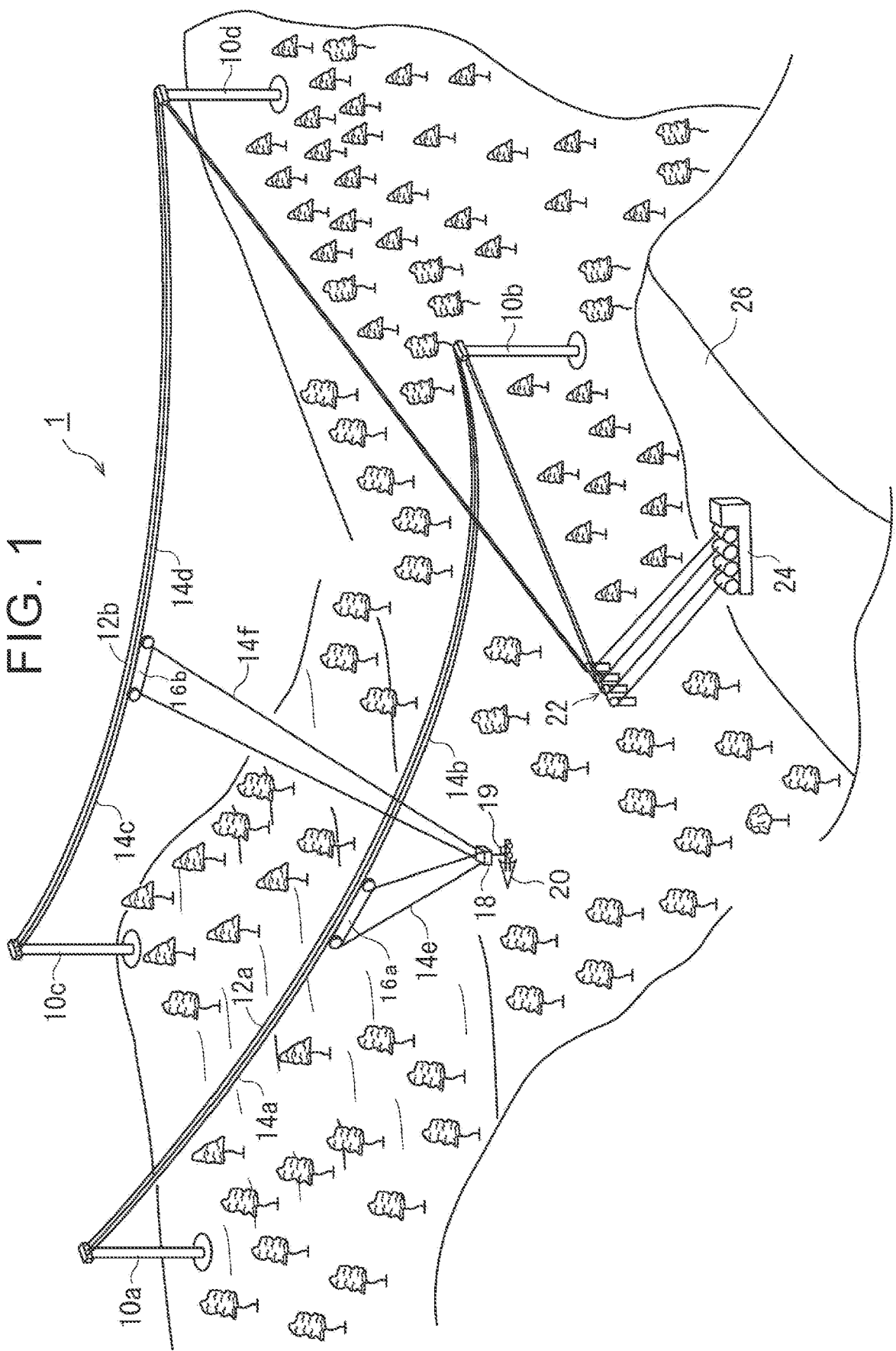
FIG. 1 is a diagram for describing an overhead line collection system.

FIG. 1 is a diagram for describing an overhead line collection system 1. The overhead line collection system 1 includes a first support post 10a, a second support post 10b, a third support post 10c, a fourth support post 10d (when the support posts are not distinguished, each support post is referred to as a "support post"), a first main rope 12a, a second main rope 12b (when the main ropes are not distinguished, each main rope is referred to as a "main rope"), a first work rope 14a, a second work rope 14b, a third work rope 14c, a fourth work rope 14d, a fifth work rope 14e, a sixth work rope 14f (when the work ropes are not distinguished, each work rope is referred to as a "work rope"), a first moving device 16a, a second moving device 16b (when the moving devices are not distinguished, each moving device is referred to as a "moving device"), a suspension device 18, guide pulleys 22, and a winch 24.

The overhead line collection system 1 is a so-called H-type system using the overhead line. The overhead line collection system 1 is used to lift a tree 20 logged in a forest using the main ropes and the work ropes stretched in the air and convey the tree 20 to the vicinity of a collecting place 26. This allows the tree 20 to be conveyed from the forest without creating roads.

The four support posts are erected at positions suitable for erection determined based on an arrangement of standing trees and a position of the collecting place 26. The support posts are each set to a size of, for example, about five meters to ten meters, depending on the size of the overhead line collection system 1, etc.

The main ropes and the work ropes are fixed to the support posts as the overhead lines or hung on the pulleys of the support posts. The first main rope 12a is fixed to the first support post 10a and the second support post 10b, and the second main rope 12b is fixed to the third support post 10c and the fourth support post 10d. The first main rope 12a and the second main rope 12b function as rails in the air. The first main rope 12a and the second main rope 12b are provided so as not to intersect with each other. A length of the main rope is about 300 to 2000 meters.

The work rope functions as a running rope wound up by the moving device or the winch 24. The first work rope 14a, the second work rope 14b, the third work rope 14c, and the fourth work rope 14d are each hung on a pulley provided for the corresponding support post, and each have one end connected to the moving device, and the other end connected to the winch 24. The first work rope 14a is stretched from the winch 24 and connected to the first moving device 16a via the second support post 10b and the first support post 10a. The second work rope 14b is stretched from the winch 24 and connected to the first moving device 16a via the second support post 10b. The third work rope 14c is stretched from the winch 24 and connected to the second moving device 16b via the fourth support post 10d and the third support post 10c. The fourth work rope 14d is stretched from the winch 24 and connected to the second moving device 16b via the fourth support post 10d. The fifth work rope 14e and the sixth work rope 14f are connected to the moving devices and the suspension device 18.

A pair of the moving devices is supported by a pair of the main ropes, and can move in the air along the main ropes. The first work rope 14a, the second work rope 14b, and the fifth work rope 14e are connected to the first moving device 16a, and the third work rope 14c, the fourth work rope 14d, and the sixth work rope 14f are connected to the second moving device 16b. The fifth work rope 14e connects the first moving device 16a and the suspension device 18, and the sixth work rope 14f connects the second moving device 16b and the suspension device 18. The moving devices have a function of lifting (winding) and lowering (feeding) the fifth work rope 14e and the sixth work rope 14f in response to a wireless command signal.

The suspension device 18 includes an elevating wire and the elevating wire is connected to a grip device 19. The guide pulleys 22 change the direction of the work ropes that are hung. The winch 24 functions as a winch for lifting each of the work ropes, and includes a drum for lifting or lowering each of the work ropes and a drive source.

Operations of the overhead line collection system 1 will be described. The winch 24 lifts one of the first work rope 14a and the second work rope 14b and lowers the other such that the first moving device 16a is moved along the first main rope 12a. The winch 24 lifts one of the third work rope 14c and the fourth work rope 14d and lowers the other such that the second moving device 16b is moved along the second main rope 12b. With the processing above, the suspension device 18 is displaced along the main ropes.

The moving devices lift one of the fifth work rope 14e and the sixth work rope 14f and lowers the other such that the suspension device 18 moves between the first moving device 16a and the second moving device 16b. With the processing above, the suspension device 18 can move horizontally in an area surrounded by the four support posts.

As described above, the winch 24 and the moving devices function as a lifting device capable of lifting the overhead lines. The lifting device winds the work ropes (overhead lines) such that the suspension device 18 and the grip device 19 are horizontally movable in the air. In the mode of the overhead line collection system 1 shown in FIG. 1, the moving devices that lift the fifth work rope 14e and the sixth work rope 14f are connected to the main ropes. However, the mode of the overhead line collection system 1 is not limited to this, and a lifting function of the moving devices can be integrated into the winch 24 when the fifth work rope 14e and the sixth work rope 14f are extended to a position of the winch 24. As described above, the lifting device may be integrated or provided separately. Further, the winch 24 may be provided for each of the support posts.

Figure 2:
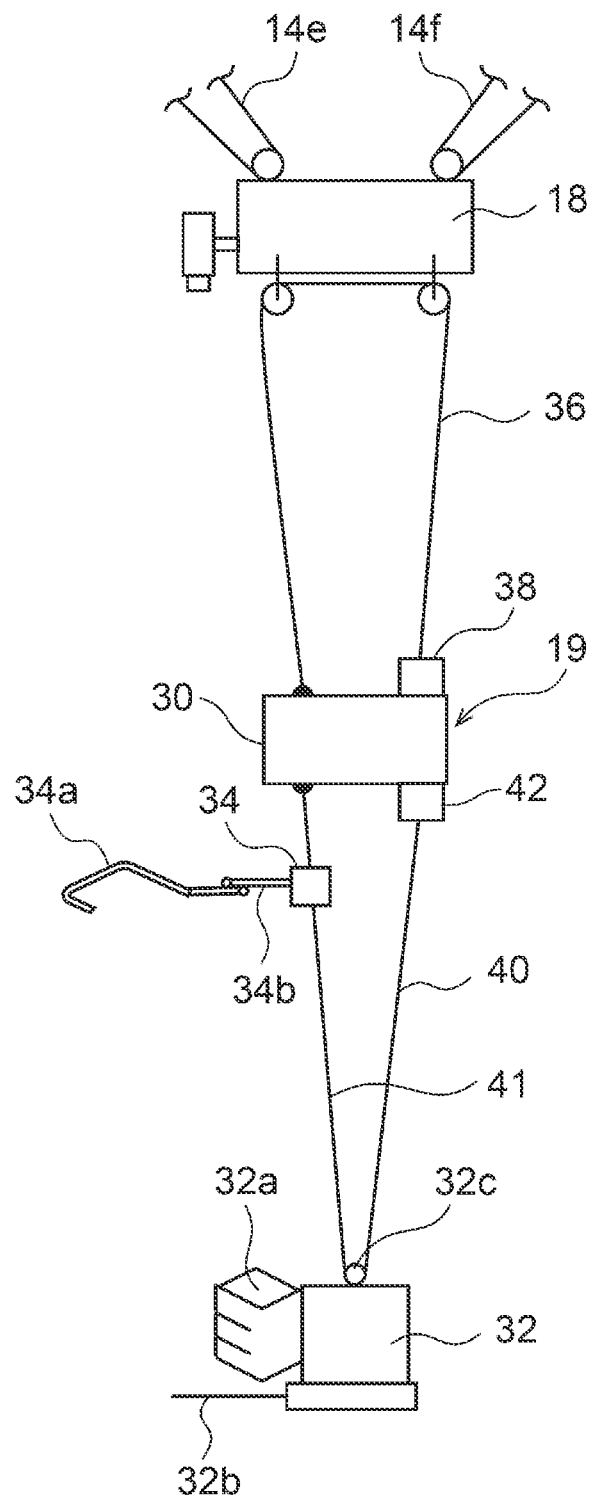
FIG. 2 is a diagram for describing a grip device that is suspended from a suspension device.

FIG. 2 is a diagram for describing the grip device 19 that is suspended from the suspension device 18. The suspension device 18 is connected to the fifth work rope 14e and the sixth work rope 14f. The grip device 19 is suspended from the suspension device 18 by a first wire 36.

The grip device 19 includes an actuator 30, a first grip portion 32, a second grip portion 34, a first motor 38, a second wire 40, and a second motor 42. The actuator 30, the first grip portion 32, the second grip portion 34, the first motor 38, and the second motor 42 can be controlled remotely and are controlled by control means that will be described later.

One end of the first wire 36 is fixed to the actuator 30, and the other end of the first wire 36 is connected to the actuator 30 such that the first wire 36 can be lifted and lowered. The first wire 36 is connected to the suspension device 18 via pulleys. The first motor 38 is provided for the actuator 30 and can lift and lower the first wire 36. The first motor 38 is driven to move the grip device 19 in a vertical direction with respect to the suspension device 18.

The first grip portion 32 and the second grip portion 34 are suspended from the actuator 30 by the second wire 40. One end of the second wire 40 is fixed to the actuator 30, an intermediate portion of the second wire 40 is connected via a pulley 32c provided for the first grip portion 32, and the other end of the second wire 40 is connected to the actuator 30 such that the second wire 40 can be lifted and lowered. The second motor 42 is provided for the actuator 30 and can lift and lower the second wire 40. The second motor 42 is driven to move the first grip portion 32 in the vertical direction with respect to the actuator 30.

The first grip portion 32 includes a pair of holding portions 32a and a cutter portion 32b. The holding portions 32a are drivable so as to narrow down and close and expand and open, and hold an outer peripheral surface of the tree. The holding portions 32a approach the tree in an expanded and opened state and are narrowed down and closed to hold the tree.

The cutter portion 32b is provided below the holding portions 32a and cuts the tree. A blade portion of the cutter portion 32b is normally housed. When the cutter portion 32b cuts the tree, the blade portion rotates along a horizontal direction and cuts the tree held by the holding portions 32a. As described above, the first grip portion 32 is integrally provided with the cutter portion 32b. Therefore, a position at which the holding portions 32a hold the tree 20 is determined by a cutting position of the tree, and thus the holding portions 32a hold the tree 20 in proximity to the root of the tree 20. The first grip portion 32 may have a sufficient weight such that the tree does not easily fall when the tree is cut.

The second grip portion 34 is a manipulator and is fixed to the second wire 40. The second grip portion 34 is provided between the actuator 30 and the first grip portion 32, and is located above and away from the first grip portion 32. The second grip portion 34 has a grip 34a and an arm portion 34b. The grip 34a is located at the tip end portion of the second grip portion 34 and grips the outer peripheral surface of the tree. The arm portion 34b has a plurality of joints and can move in a direction away from the second wire 40 such that the grip 34a can be brought closer to the tree.

The grip device 19 can move the actuator 30 up and down by driving the first motor 38, and can move the first grip portion 32 up and down by driving the second motor 42. This configuration makes it possible to cause the first grip portion 32 and the second grip portion 34 to grip the tree at appropriate positions of the tree, respectively.

Figure 3C:
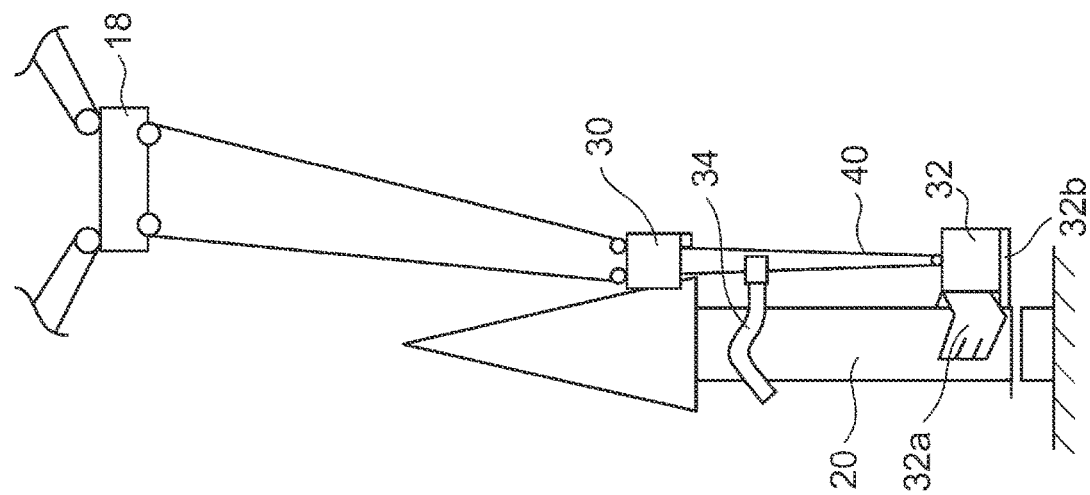
FIG. 3C is a diagram for describing an operation of the overhead line collection system that collects a tree.
Figure 3B:
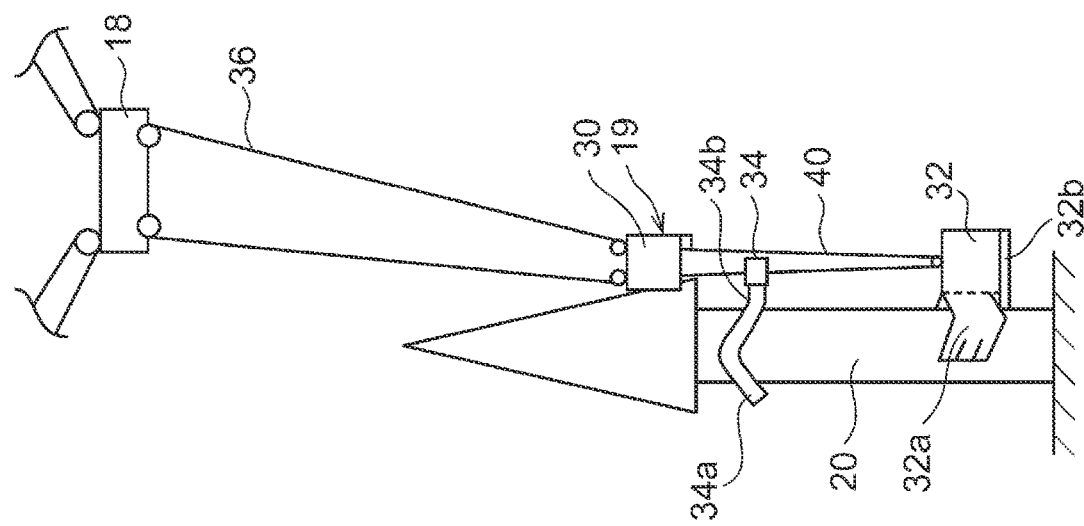
FIG. 3B is a diagram for describing an operation of the overhead line collection system that collects a tree.
Figure 3A:
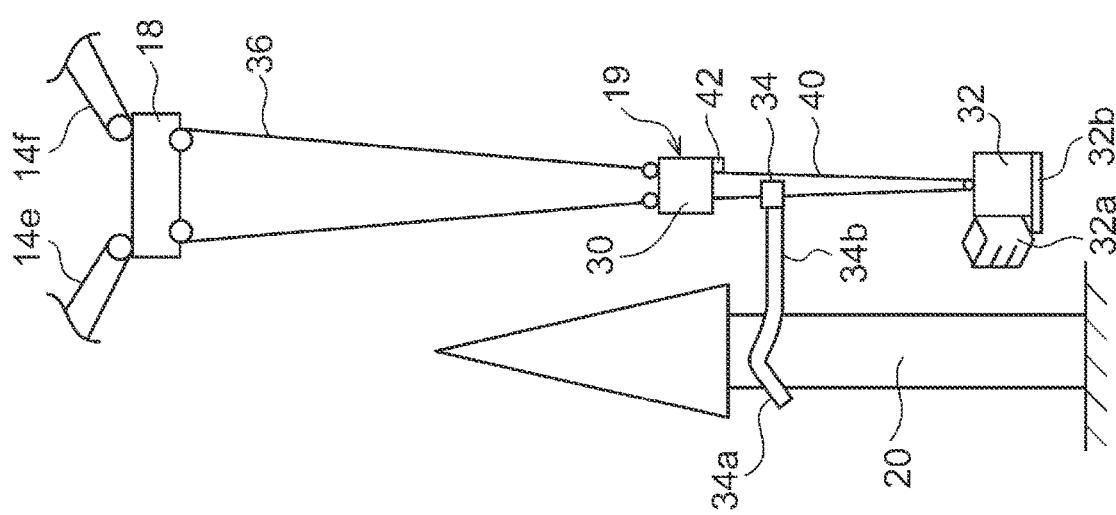
FIG. 3A is a diagram for describing an operation of the overhead line collection system that collects a tree.

FIGS. 3A, 3B, and 3C are diagrams for describing operations of the overhead line collection system 1 that collects the tree 20. FIG. 3A shows a state where the suspension device 18 is positioned in proximity to the tree 20 and the grip device 19 is lowered to a position on a root side of the tree 20. The grip 34a of the second grip portion 34 grips the tree 20.

Control for lowering the grip device 19 and control for causing the second grip portion 34 to grip the tree 20 may be executed through a program provided in advance, and may be executed by operations by an operator. Further, the overhead line collection system 1 may be controlled in combination of the program and the operations by the operator. For example, the operator controls the overhead line collection system 1 while visually checking images transmitted from cameras provided for the suspension device 18 and the actuator 30, etc.

FIG. 3B shows a state where the arm portion 34b is driven so as to contract and the first grip portion 32 approaches the tree 20. The grip device 19 is displaced horizontally with respect to the suspension device 18. When the first grip portion 32 approaches the tree 20, the holding portions 32a hold the root side of the tree 20. The first grip portion 32 grips the root side of the tree, and the second grip portion 34 grips an upper portion of the tree with respect to the first grip portion 32. The second grip portion 34 may grip an intermediate portion of the tree 20 and may grip a portion of the tree 20 above half a tree height. With this configuration, the first grip portion 32 and the second grip portion 34 grip the tree 20 at two points. An interval between the first grip portion 32 and the second grip portion 34 may be determined in accordance with a height of the tree 20.

FIG. 3C shows a state where the first grip portion 32 and the second grip portion 34 grip the tree 20 and the cutter portion 32b cuts the tree 20. The cutter portion 32b is located below the holding portions 32a and the second grip portion 34. Therefore, when the tree 20 is cut, the state where the tree 20 is gripped at two points is maintained. This makes it possible to suppress a damage on other trees caused by the tree 20 falling over.

FIGS. 4A, 4B, and 4C are diagrams for describing operations of the overhead line collection system 1 that collects the tree 20, showing a sequence following FIG. 3C. FIG. 4A shows a state where the cutter portion 32b cuts the root side of the tree 20 and the first grip portion 32 and the second grip portion 34 grip the tree 20 in the air. In this state, the tree 20 is in an almost upright state. The interval between the first grip portion 32 and the second grip portion 34 and the weight of the first grip portion 32 are determined such that the tree 20 does not fall over after being cut.

FIG. 4B shows a state where the cut tree 20 is moved upward. The first motor 38 is driven to lift the first wire 36 such that the grip device 19 gripping the tree 20 moves upward. The tree 20 is lifted in a substantially upright state. Therefore, the tree 20 can be moved above the other trees while avoiding being caught by the other trees. The tree 20 may be moved up in the air in a manner such that the first wire 36 is lifted to the maximum. However, the tree 20 may be moved up to a height exceeding the surrounding trees without lifting the first wire 36 to the maximum.

FIG. 4C shows a state where the cut tree 20 is turned sideways. After the tree 20 is moved up and the first motor 38 stops driving, the second motor 42 is driven to lift the second wire 40, and the first grip portion 32 moves upward to approach the actuator 30. With this configuration, the root portion of the tree 20 gripped by the first grip portion 32 is moved up, and this inclines the tree 20. A longitudinal direction of the tree 20 thus becomes along the horizontal direction. A lowermost end of the tree 20 moves upward by the interval between the first grip portion 32 and the second grip portion 34. The state where the longitudinal direction of the tree 20 is along the horizontal direction is the state where the tree 20 is turned sideways. The grip device 19 can move up the tree 20 to a higher position by moving up the first grip portion 32 to tilt the tree 20, compared to a case where the second grip portion 34 is lowered to tilt the tree 20.

The overhead line collection system 1 cuts and conveys the tree 20 without the operator moving to a location of the tree 20, which significantly alleviates a work load imposed on the operator. Further, when the tree 20 is cut, the tree 20 can be moved up in the air without falling over, which makes it possible to suppress a damage on other trees caused by the tree 20 falling over.

The suspension device 18 and the grip device 19 are horizontally moved in the air and the tree 20 gripped by the grip device 19 is conveyed in a manner such that the tree 20 is turned sideways and the lifting device lifts the work ropes (overhead lines). With this configuration, the tree 20 is conveyed while the lowermost end of the tree 20 is placed at a high position, which makes it possible to convey the tree 20 stably over the other trees without being caught by other trees. Therefore, the height of the support post can be reduced, thereby reducing a cost required for the support post. Further, compared to a case where the tree 20 is conveyed in an upright state, the overhead line collection system 1 can easily lower the tree 20 to the ground while the tree 20 is turned sideways.

Figure 5:
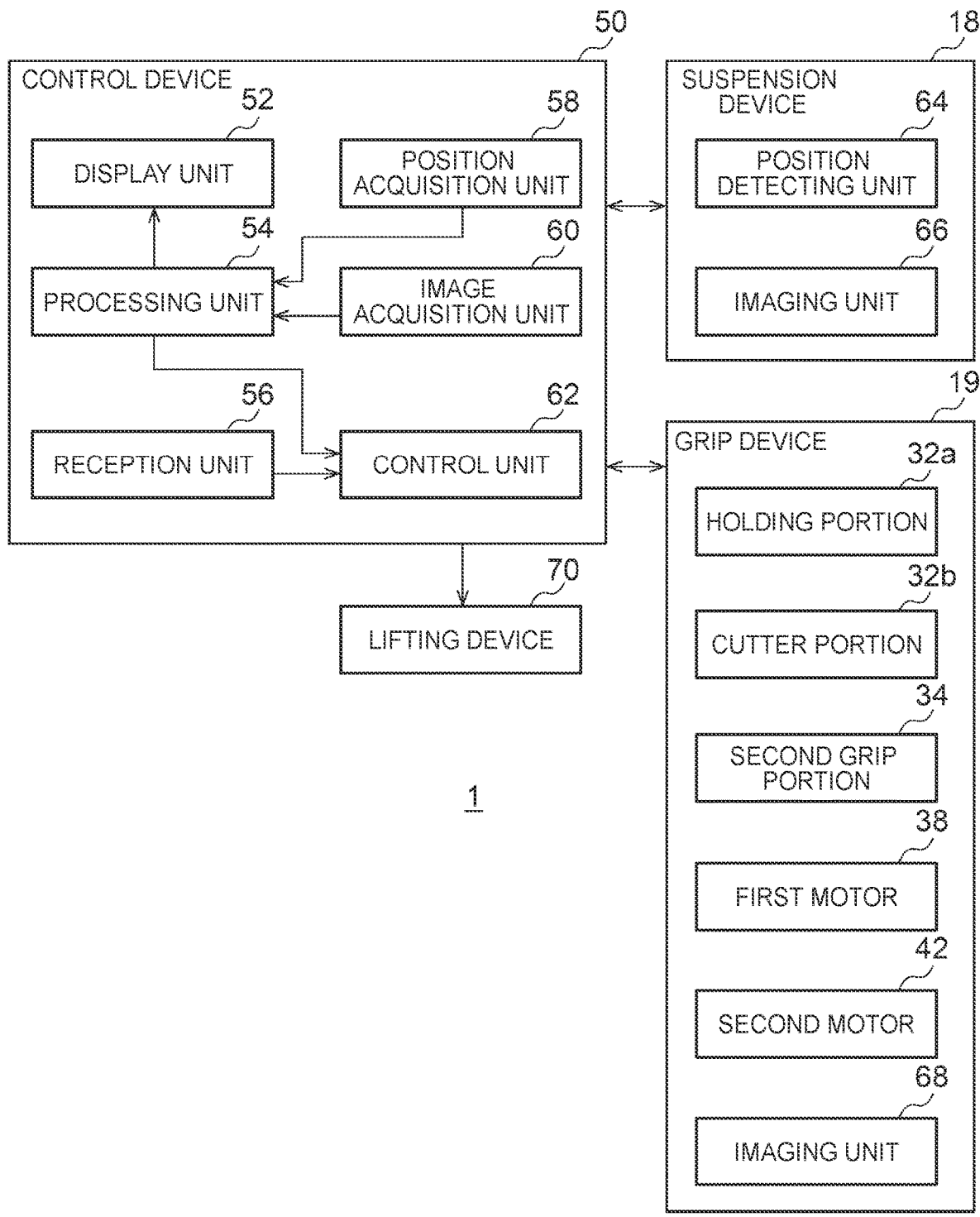
FIG. 5 shows a functional configuration of the overhead line collection system.

FIG. 5 shows a functional configuration of the overhead line collection system 1. The control device 50 is provided in a control room and can remotely control the lifting device 70, the suspension device 18, and the grip device 19. The lifting device 70 includes the winch 24 and the moving devices and is communicable with the control device 50.

The suspension device 18 includes a position detecting unit 64 and an imaging unit 66, and is communicable with the control device 50. The position detecting unit 64 detects position information of the suspension device 18 using a satellite positioning system. The imaging unit 66 is a camera provided in the suspension device 18, mainly captures a lower portion of the suspension device 18, and detects a captured image including the grip device 19.

The grip device 19 includes an imaging unit 68 in addition to the holding portions 32a, the cutter portion 32b, the second grip portion 34, the first motor 38, and the second motor 42. The imaging unit 68 is provided in the actuator 30 and captures images of the first grip portion 32 and the second grip portion 34. In the grip device 19, each of the actuator 30, the first grip portion 32, and the second grip portion 34 may be communicable with the control device 50, and any of the actuator 30, the first grip portion 32, and the second grip portion 34 may be connected by wire. For example, the actuator 30 may have a communication function with the control device 50, and the first grip portion 32 and the second grip portion 34 may be connected to the actuator 30 by wired or short-range wireless communication. In any case, each of the devices of the grip device 19 can exchange information with the control device 50.

The control device 50 includes a display unit 52, a processing unit 54, a reception unit 56, a position acquisition unit 58, an image acquisition unit 60, and a control unit 62. The position acquisition unit 58 acquires position information of the suspension device 18 from the suspension device 18. The image acquisition unit 60 acquires captured images from the suspension device 18 and the grip device 19, respectively. The reception unit 56 is a touch panel or a mechanical controller, and receives operations by the operator.

The processing unit 54 generates command information to move the suspension device 18 to a predetermined position based on the position information of the suspension device 18 and the captured images of the suspension device 18 and the grip device 19. For example, the processing unit 54 generates the command information for moving the suspension device 18 to the position of the tree 20 to be logged.

The processing unit 54 generates a display image to be displayed on the display unit 52 based on the position information of the suspension device 18 and the captured images of the suspension device 18 and the grip device 19. The operator operates the suspension device 18 and the grip device 19 while visually checking the position information of the suspension device 18 and the captured images of the suspension device 18 and the grip device 19 displayed on the display unit 52.

As described above, the processing unit 54 automatically executes movement of the suspension device 18, and the operator operates driving of the grip device 19. The operator may operate a step in which the second grip portion 34 and the first grip portion 32 grip the tree 20, and the processing unit 54 may automatically execute other steps of cutting and tilting the tree 20. Note that, the processing unit 54 may automatically execute the entire step of collecting the tree 20.

When the grip device 19 tilts the tree 20 such that the tree 20 approaches the horizontal direction, the processing unit 54 may determine whether the longitudinal direction of the tree 20 is along the horizontal direction based on the image captured by the imaging unit 68. The processing unit 54 may calculate a horizontal degree of the tree 20 based on sizes of the first grip portion 32 and the second grip portion 34 included in the captured images, and may calculate the horizontal degree of the tree 20 based on changes in a diameter of the tree 20 included in the captured images. When the horizontal degree of the tree 20 is within a predetermined range, the processing unit 54 determines that the longitudinal direction of the tree 20 is along the horizontal direction. For example, when the longitudinal direction of the tree 20 is within an angle range of minus 15 degrees to plus 15 degrees with respect to the horizontal direction, the processing unit 54 determines that the longitudinal direction of the tree 20 is along the horizontal direction. Note that, the processing unit 54 may determine whether the longitudinal direction of the tree 20 is along the horizontal direction based on a detection result of a sensor that detects a lifting amount of the second wire 40.

The control unit 62 controls the lifting device 70, the suspension device 18, and the grip device 19 based on the command information from the processing unit 54 or operation information of the operator input to the reception unit 56. The control unit 62 controls the lifting device 70 so as to move the suspension device 18 to a predetermined position. The control unit 62 controls the grip device 19 in accordance with the operation by the operator.

Figure 6:
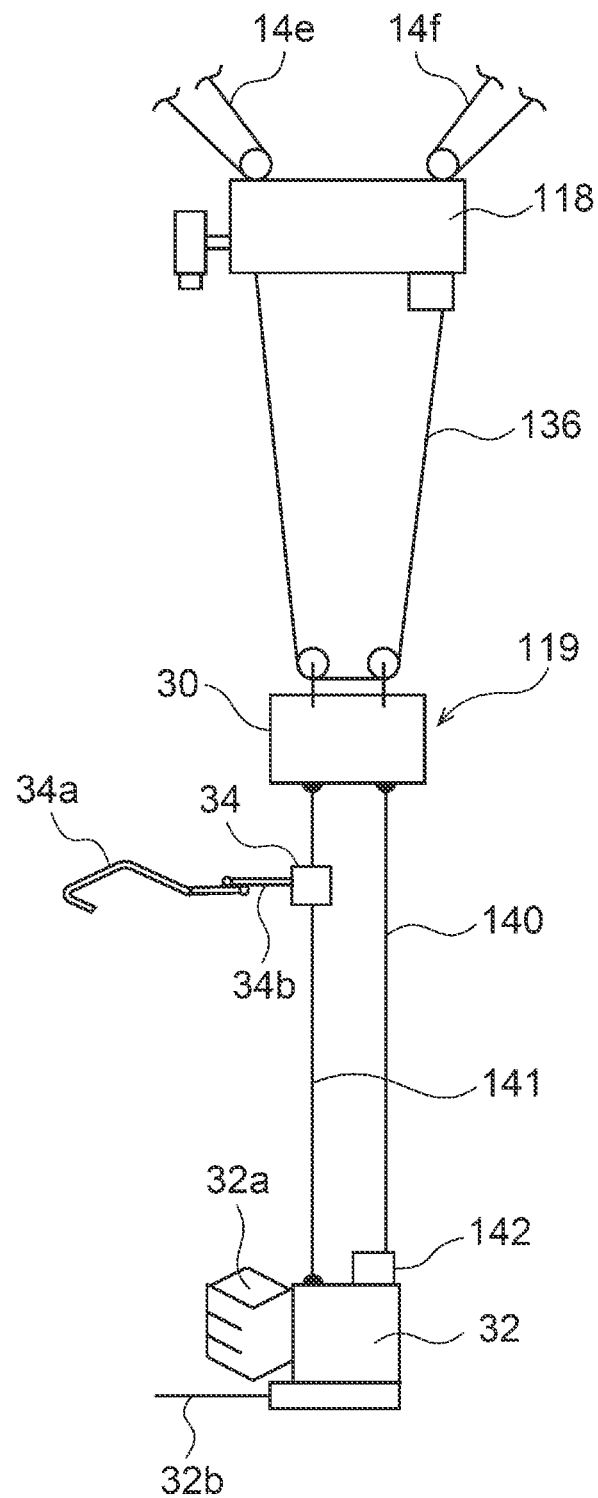
FIG. 6 is a diagram for describing a suspension device and a grip device of a modified example.

FIG. 6 is a diagram for describing a suspension device 118 and a grip device 119 of a modified example. The suspension device 118 and the grip device 119 of the modified example have configurations in which a first motor 138 and a second motor 142 are disposed at different locations, compared to the suspension device 18 and the grip device 19 shown in FIG. 2.

The first motor 138 can lift and lower a first wire 136 and is provided for the suspension device 118. One end of the first wire 136 is fixed to the suspension device 118, the middle of the first wire 136 is connected to pulleys of the grip device 119, and the other end of the first wire 136 is connected to the first motor 138 so as to be liftable.

The second motor 142 can lift and lower a second wire 140 and is provided for the first grip portion 32. The actuator 30 and the first grip portion 32 are connected by the second wire 140 and a third wire 141. An upper end of the second wire 140 is fixed to the grip device 119, and a lower end side of the second wire 140 is connected to the second motor 142 so as to be liftable.

An upper end of the third wire 141 is fixed to the grip device 119, and the other end of the third wire 141 is fixed to the first grip portion 32. The second grip portion 34 is fixed in the middle of the third wire 141.

The grip device 119 moves up and down as the first motor 138 lifts or lowers the first wire 136. The first grip portion 32 moves up and down as the second motor 142 lifts or lowers the second wire 140. As described above, even when the positions of the first motor 138 and the second motor 142 are different, operations similar to the operations of the overhead line collection system 1 shown in FIG. 2 can be executed.

The disclosure has been described above based on the embodiment. The embodiment is merely an example, and it is understood by those skilled in the art that various modifications are possible for each component and combination of the processing processes, and that such modifications are also within the scope of the disclosure.

For example, in the embodiment, the mode in which the first grip portion 32 is moved upward when the tree 20 in an upright state is tilted sideways is shown. However, the disclosure is not limited to this mode. The second grip portion 34 may be lowered to tilt the tree 20 sideways.

Further, in the embodiment, the mode in which the first grip portion 32 cuts the tree 20 is shown. However, the mode is not limited to this mode. For example, the tree 20 may be cut by another device, and the operator may cut the tree 20.

Further, in the embodiment, the mode in which the first grip portion 32 and the second grip portion 34 grip the tree 20 is shown. However, the disclosure is not limited to this mode, and the grip device 19 may have yet another grip portion. That is, the grip device 19 may grip the tree 20 at three points.

What is claimed is:
1. A collection method using a collection system including a winch that is configured to wind up an overhead line supported by a support post, a suspension device that is connected to the overhead line and is movable in the air as the winch winds the overhead line, and a grip device suspended from the suspension device, the collection method comprising:
- a step of gripping a tree in an upright state by the grip device at two or more points, the grip device includes a first grip portion that grips a root side of the tree and a second grip portion that grips an upper portion of the tree with respect to the first grip portion, the first grip portion and the second grip portion are connected by a first wire, and the first grip portion is suspended by a second wire,
- a step of cutting the gripped tree at the root side of the tree while gripping the tree at the root side and the upper portion of the tree;
- a step of tilting the cut tree by winding up the second wire and moving the first grip portion upward such that a longitudinal direction of the tree is along a horizontal direction while gripping the tree at the root side and the upper portion of the tree; and
- a step of conveying the tree gripped by the grip device as the winch winds the overhead line.

2. The collection method according to claim 1, further comprising a step of moving the cut tree upward between the step of cutting the tree and the step of tilting the tree.

3. A collection system, comprising:
a plurality of support posts;
an overhead line supported by the support posts;
a winch that is configured to wind up the overhead line;
a suspension device that is connected to the overhead line and is movable in the air as the winch winds the overhead line; and
a grip device suspended from the suspension device, wherein:
the grip device includes
- a first grip portion that grips a root side of a tree in an upright state,
- a second grip portion that grips an upper portion of the tree with respect to the first grip portion in the upright state,
- a first wire that connects the first grip portion and the second grip portion,
- a second wire that suspends the first grip portion, and
- a motor that winds up the second wire;

the motor is driven to wind the second wire so as to tilt the tree that is cut such that the cut tree is alone a horizontal direction; and
the winch winds the overhead line to convey the tilted tree.

* * * * *